Figure 4:
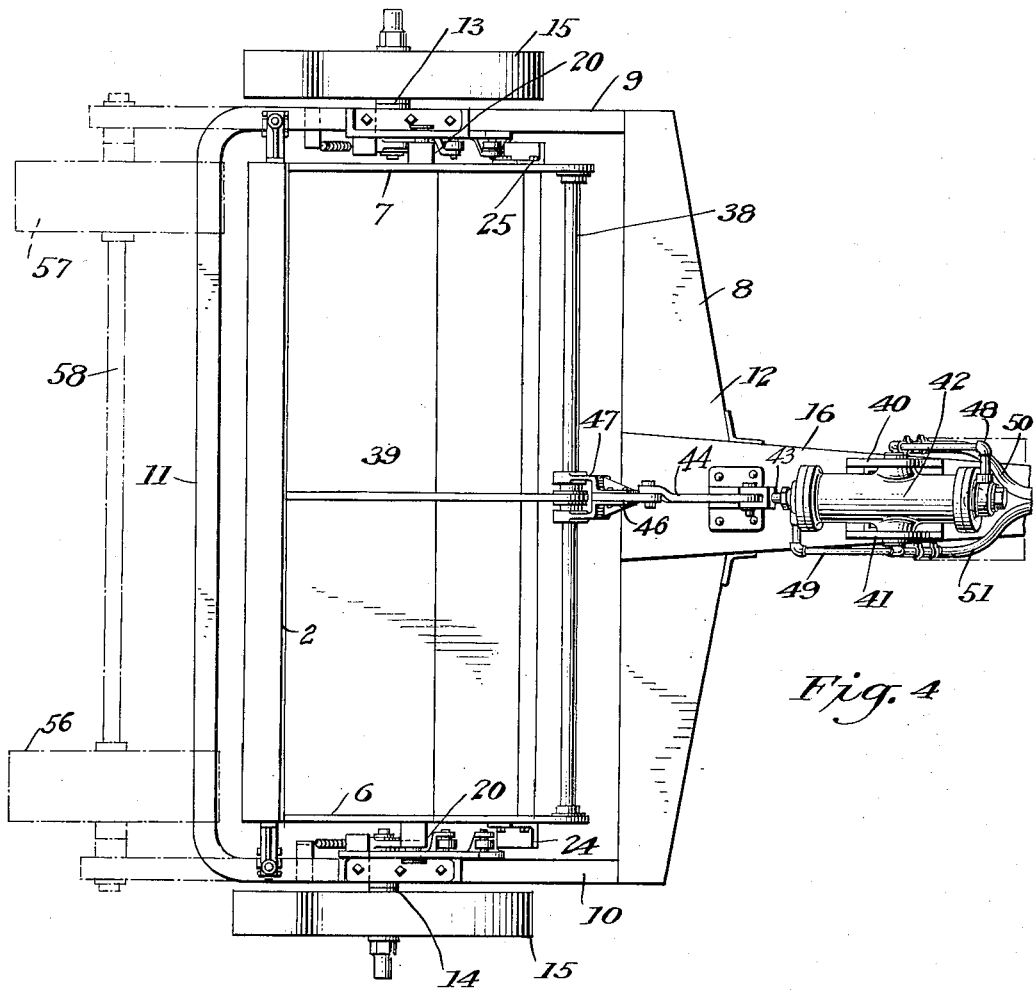

July 3, 1934.   L. O. BIRD   1,965,364
POWER CONTROLS
Filed Oct. 27, 1931   2 Sheets-Sheet 1

INVENTOR,
Len O. Bird;
BY Calvin Brown,
ATTORNEY

July 3, 1934.  L. O. BIRD  1,965,364
POWER CONTROLS
Filed Oct. 27, 1931   2 Sheets-Sheet 2

INVENTOR,
Len O. Bird;
BY
ATTORNEY

Patented July 3, 1934

1,965,364

UNITED STATES PATENT OFFICE 1,965,364

POWER CONTROLS

Len O. Bird, Glendale, Calif., assignor to W. L. Adams, Rexburg, Idaho

Application October 27, 1931, Serial No. 571,339

5 Claims. (Cl. 37—129)

This invention relates to scrapers of the power control type. Scrapers are now universally used for the purpose of leveling given areas of ground, and said scrapers have generally fallen into two classes, to-wit, the wheeled carriage and drag types. This invention relates more particularly to the wheeled carriage type of scraper.

An object of the present invention is to provide a scraper with associated elements which permit the scraper to be controlled as to operation from a tractor in a positive manner and at the will of the operator.

Another object is the provision of a scraper of the character stated, wherein the parts are so arranged that the scraper may be moved to selected positions quickly and efficiently.

Another object of the invention is the provision of a scraper which is hydraulically controlled as to movement and in such a manner that the scraper blade may be positioned at different levels relative to the surface to be cut, and held at a selected level without imposing stress or strain upon the hydraulic control mechanism.

Another object is the provision of a scraper which may be controlled with or without power mechanism from some vehicle, such as a tractor, adapted to draw the scraper over ground.

In the present invention, the scraper is so situated that the several parts cooperate therewith in such a manner that the blade of the said scraper may cut deeply into the ground while loading the scraper, or a shallow cut may be afforded, and after a loading of the said scraper, the scraper blade may rest slightly above the ground level, or the blade may drag lightly on the ground and an extra large amount of dirt accumulated forward thereof.

Another object includes a scraper which may be power controlled in such a manner that the said scraper may be moved to different positions to afford loading, dumping, and spreading of the load to any desired thickness.

Another object of the invention is the provision of a scraper which is mounted in a novel manner to a supporting structure, to the end that the scraper may quickly clear a ground surface and discharge a load therefrom.

Another object is the provision of a scraper so mounted and controlled that the blade edge thereof may be held in various angular positions for the purpose of leveling a road.

Another object is the provision of a scraper which may be moved from a ground engaging position to a load dumping position and then returned in such a manner that the blade clears the ground level when the scraper is in normal carrying position, and which scraper may then be released to drop the blade of the scraper into ground engaging position.

The invention has for further objects the provision of a scraper which is novel of construction, efficient in operation, inexpensive in cost of manufacture, of few parts, and generally superior to scrapers now on the market so far as the inventor is aware.

With the above mentioned and other objects in view, the invention consists in the novel and useful provision, formation, construction, association, and relative arrangement of parts, members and features, all as shown in a certain embodiment in the accompanying drawings, described generally, and more particularly pointed out in the claims.

Figure 5:
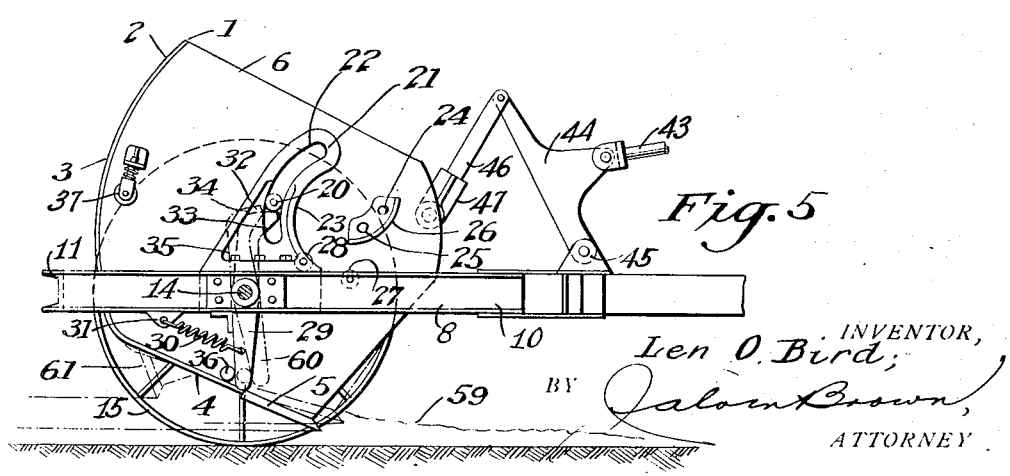

In the drawings:

Figure 1 is a side elevation of the scraper as an entirety, including a wheeled carriage therefor adapted to be drawn by some vehicle, such as a tractor, Figure 2 is a fragmentary side elevation of the scraper shown in Figure 1 and shown in the act of having the scraper blade thereof engage a surface to be leveled, Figure 3 is a view similar to Figure 2 with the scraper moved to a different position from that of Figure 2, to-wit, a dumping position, Figure 4 is a fragmentary plan view of the scraper shown in Figure 1, and, Figure 5 is a side elevation of the scraper showing the blade thereof elevated above a ground surface.

Referring with particularity to the drawings, the said scraper is shown at 1, and this said scraper includes a bowl 2 having back and bottom portions 3 and 4, respectively, the bottom portion of which directly communicates with a bowl cutting blade 5. As is customary, the said bowl is provided with end plates 6 and 7. The said scraper is adapted to be mounted to a wheeled carriage designated generally as 8. Said wheeled carriage includes side framing 9 and 10 interconnected by a rear framing member 11 and a front framing 12, the said scraper being surrounded by said framing. Trunnions 13 and 14 are secured to the side frame members 9 and 10, respectively, and a wheel 15 is provided for each respective trunnion. The front frame member 12 may be of box construction, and centrally secured to said member 12 and extending therefrom is a tongue 16. This tongue is adapted to be secured to a draw bar 17 extending rearwardly from the tractor shown at 18. This tongue is secured to the draw bar through the medium of any suitable coupling, such as that shown at 19.

Both ends of said bowl are provided with trunnions 20. Both side frame members 9 and 10 are provided with brackets 21. These said brackets are substantially parallel and secured to the tops of the said side framing and extend upwardly from said side framing. Both brackets are identical in construction and both are provided with arcuate slots 22. The said trunnions 20 are received in the arcuate slots 22 of the said brackets. It will, therefore, be seen that the center of rotation for said scraper relative to the frame is not a fixed one, but is governed by the position of the trunnions of said scraper within the arcuate slots of said brackets. The forwardly facing edge 23 of both brackets is curved and said curvature corresponds to the curvature of the said segmental arcuate slot 22. The purpose of so forming the bracket will be set forth in the statement of operation. What I may term as rockers 24 are provided for both ends 6 and 7 of the scraper. These said rockers are secured in any desired manner, such as by the means 25, to said sides, and the said rockers are both segmental in form and are both provided with curved work-engaging faces 26, the curvature of which is the same as that for the curved face or edge 23 of each respective bracket 21. Each side frame carries one or more spaced antifriction means, such as rollers, at 27 and 28, and the peripheries of the said rollers are adapted, in certain positions of the said scraper, to be in engagement with the working faces 26 of the said rockers 24. In this respect, it will be seen that the rollers 28 are really carried by the brackets 21 and that the periphery of each roller 28 extends slightly beyond the arcuate surface 23 of each bracket. At this time, attention is directed to the fact that the trunnions for the wheeled carriage and the trunnions for the scraper are in eccentric relation. The purpose of this will likewise be set forth in the statement of the operation.

Carried upon each trunnion 13 and 14, respectively, is a dog or lever 29. Each dog or lever is normally urged to move in one direction, to-wit, clockwise, when viewing Figure 5, through the medium of a coil spring 30, one end of which is secured to the dog and the other end of which is fastened to the side framing as, for instance, illustrated at 31. One end of each dog or lever is provided with a nose 32. This nose is formed with an inclined surface 33 while the top 34 of the nose is substantially at right angles to a side edge 35 thereof. Through the medium of the springs 30, each lever or dog is normally urged into a position adjacent each bracket 21 so as to engage the trunnions 20 of the said scraper during certain movement of the said trunnions within the arcuate slots 22 of the said brackets. Both sides of the scraper are provided with stops 36, which in certain positions of the bowl of the scraper will engage the dogs or levers 29, and in other positions of the said bowl, be out of engagement with said dogs or levers. When the bowl of the scraper is in the position shown in Figure 1, the trunnions 20 are at the bottom of the arcuate slots 22 of both brackets and the weight of said scraper bowl is communicated from said trunnions to the said brackets and thence to the frame, and likewise a part of the weight of said scraper is communicated to the said frame through the medium of spring bumpers 37. Two of these bumpers are provided, one for each side of the said scraper, and it will be observed that when the scraper is in the position of Figure 1, the spring bumpers engage the frame and adjacent the bowl back.

A shaft 38 extends transversely between the bowl sides and forwardly of the bowl back. I have provided a center brace 39 for the said scraper, which brace extends between the said shaft and the bowl back. Mounted upon the tongue 16 is a bracket member provided with spaced sides 40 and 41, between which sides is trunnioned a cylinder 42. A piston (not shown) is adapted for movement within the said cylinder, and the piston rod 43 of said piston is secured to a bell crank lever 44. One lever portion of said bell crank is pivotally secured to means 45, which means is secured to the tongue. An opposite portion of said lever has pivotally secured thereto a link 46, and which link in turn, through the medium of a bifurcated member or clevis 47, is secured to the shaft 38. In this connection, it will be observed that one end of the brace 39 engages the shaft 38 between the furcations of the bifurcated member 47.

Both ends of said cylinder 42 have tubes communicating therewith. These tubes are herein designated as 48 and 49, respectively, and a flexible hose connection 50 and 51 is provided for each respective tube 48 and 49. Said flexible hose in turn communicates with a valve controlled power take-off designated generally as 52, associated with the tractor 18. This power take-off is controlled by movement of a lever 53 adjacent the operator's seat 54.

In addition to the foregoing, I have illustrated a possible construction for the said scraper, wherein I have provided a castor 55 secured to the tongue, and a pair of wheels 56 and 57 mounted on a common axle 58, which axle in turn is secured to extensions of the side members of the framing 9 and 10 in lieu of the wheels 15.

The operation, uses and advantages of the invention just described are as follows:

Figure 1 illustrates the scraper with the blade element thereof positioned adjacent a surface and not necessarily in contact therewith. When the said blade and bowl are in the position just referred to, the trunnions 20 rest in the bottom of the slots 22 of the brackets 21, and the bumpers 37 are engaging the side members 9 and 10 of the framing. It will likewise be observed that the inclined lower surface 33 of the nose 32 of both levers or dogs 29 is above the said trunnions 20. If the lever 53 is now moved in one direction, fluid under pressure may be delivered through one of the hose conduits into one end of the cylinder to rock the bell crank lever 44. Assume this pressure to be delivered rearwardly of the piston head, which will drive the piston rod 43 outwardly from the cylinder to rock the bell crank lever 44 in an anti-clockwise direction from the showing of Figure 1. This movement of the bell crank is communicated to the link, thence to the shaft 38 which will rock the scraper about the said trunnions, with relation to the brackets, in a clockwise direction and cause the blade 5 to be in earth engaging position or in the position shown in Figure 2, the arrow at 57 indicating the general direction of movement of the bowl. After the bowl has received a given load, the said bowl may be further rocked or moved by operating the lever 53 to further rock the bell crank 44. If we assume that this further movement is represented by the dotted line position 58 of Figure 2, it will be observed that the rockers 24 are now brought into engagement with the rollers 27. As a matter of fact, when the blade is engaging a surface as shown in Figure 2, the said rockers just commence their engagement with said rollers. If now the scraper is moved by further rocking movement of the bell crank, the rockers will engage both rollers 27 and 28 which will cause travel of the trunnions 20 within the arcuate slots 22 of the brackets 21, to the end that the axis of rotation of said scraper progressively moves to different positions. Referring to Figure 3, the said trunnions are shown in progressively different positions within the arcuate slots of the said brackets and in the upward movement of said trunnions, the dogs or levers 29 are moved out of the path of said trunnions, due to the fact that the edge 33 of said dogs or levers is inclined. Movement of the scraper causes movement of the rockers, and the rockers by engaging the rollers 27 and 28, cause rapid travel of the trunnions 20 within the arcuate slots 22 of the brackets 21 to elevate the said scraper relative to the frame and wheeled structure 15.

Referring to Figure 3, it will be seen that the scraper is in dumping position. The scraper may be moved to the dotted line position at 58 so that the blade thereof may grade or smooth the material dumped. Upon pumping fluid to the opposite side of the piston, the bell crank lever 44 is moved in a clockwise direction, viewing Figure 1. and the scraper is rotated and lowered until the trunnions 20 engage the flat heads or surfaces 34 of the dogs or levers 29. This position is illustrated in Figure 5, wherein it will be seen that the rockers 24 are out of engagement with the rollers 27 and 28. In this position, the stops 36 engage the dogs or levers 29. Furthermore, the blade 5 is elevated above the ground surface. As indicated at 59, the blade may, while in this position, smooth the surface of the dirt which has been dumped. Inasmuch as there is an off-center relationship between the stops 36 and the position of the trunnions 20, in the showing of Figure 5, further movement of the bell crank only serves to cause the stops 36 to move the levers or dogs 29 from the full line position to the dotted line position at 60 and permit the trunnions 20 to be received in the bottom of the slots 22 of the brackets 21, whereupon the scraper assumes the position shown in Figure 1. Several positions for the scraper are shown by the dotted lines at 61 of Figure 5, and 62 of Figure 3. Obviously, the position 61 permits the dirt or other material dumped by the scraper to be leveled and at substantially a different level from that which would be obtained by the full line position of the scraper of Figure 5. The position 62 is caused by further movement of the bell crank 44 in a clockwise direction, viewing Figure 1.

It might be said in passing that as long as the blade 5 engages formation to smooth the same, the bowl of the scraper would be held in a position such as illustrated in Figure 5. However, after the blade no longer engages formation, there is no resistance against the blade of the bowl, with the result that the stops 36 will move the said levers or dogs 29 and permit the trunnions 20 to drop to the bottom of the slots 22, the hydraulic pressure being released.

A very important feature of the invention resides in the provision of the rockers 24. If the said scraper is allowed to revolve on its trunnions 20 in the ordinary manner, the dumping operation would be less rapid. By providing the said rockers on the forward portion of the side members of the bowl, these said rockers will engage the rollers 27 as well as 28 the moment the scraper starts to dump any material received within the bowl. Hence the blade of the scraper starts to clear the ground at once and discharge the load more rapidly.

It is obvious that various changes and modifications and variations may be made in practicing the invention in departure from the particular showing of the drawings without departing from the true spirit thereof.

I claim:

1. In a device of the character disclosed, a scraper, a supporting structure therefor, hydraulic means for revolving said scraper relative to said supporting structure, and means including a shoe and a contact roller between the supporting structure and said scraper adapted to position said scraper at different levels relative to the said supporting structure during rotation of said scraper.

2. In a device the character disclosed, a frame, a scraper, bracket members carried by said frame, trunnions attached to said scraper movable relative to said brackets to position said scraper at different levels relative to the frame, hydraulic means for rotating said scraper relative to said brackets and framing, and means effecting travel of said trunnions relative to said brackets during said rotation.

3. In a device of the character disclosed, a scraper, an encircling framing therefor, a pair of bracket members both formed with arcuate slots carried by the framing, trunnions for said scraper received in the arcuate slots of both brackets, rocker means carried by the scraper, and means for rotating said scraper, in combination with means to be engaged by said rocker means to cause travel of said trunnions within the arcuate slots of said brackets to elevate the scraper during rotation thereof.

4. In a device of the character disclosed, a scraper, an encircling framing therefor, a pair of bracket members both formed with arcuate slots carried by the framing, trunnions for said scraper received in the arcuate slots of both brackets, rocker means carried by the scraper, means for rotating said scraper, in combination with means to be engaged by said rocker means to cause travel of said trunnions within the arcuate slots of said brackets to elevate the scraper during rotation thereof, and a rockable dog in the path of movement of one of said trunnions to maintain said scraper in a given position relative to the brackets during reverse rotation of the scraper.

5. In a device of the character disclosed, a scraper, an encircling framing therefor, a pair of bracket members both formed with arcuate slots carried by the framing, trunnions for said scraper received in the arcuate slots of both brackets, rocker means carried by the scraper, means for rotating said scraper, in combination with means to be engaged by said rocker means to cause travel of said trunnions within the arcuate slots of said brackets to elevate the scraper during rotation thereof, a rockable dog in the path of movement of one of said trunnions to maintain said scraper in a given position relative to the brackets during reverse rotation of the scraper, and means for releasing the dog from engagement with said trunnions to permit further rotation of the scraper. LEN O. BIRD.